(12) United States Patent
Maezawa et al.

(10) Patent No.: US 7,026,631 B2
(45) Date of Patent: Apr. 11, 2006

(54) RADIATION IMAGE CONVERSION PANEL AND PREPARATION METHOD THEREOF

(75) Inventors: Akihiro Maezawa, Hino (JP); Noriyuki Mishina, Ome (JP)

(73) Assignee: Konica Corporation, Tokyo (JP)

(*) Notice: Subject to any disclaimer, the term of this patent is extended or adjusted under 35 U.S.C. 154(b) by 299 days.

(21) Appl. No.: 10/444,051

(22) Filed: May 22, 2003

(65) Prior Publication Data
US 2003/0222224 A1    Dec. 4, 2003

(30) Foreign Application Priority Data
May 31, 2002  (JP) .............................. 2002-159429
May 31, 2002  (JP) .............................. 2002-159430

(51) Int. Cl.
*G03B 42/02*    (2006.01)

(52) U.S. Cl. .................................. 250/484.4

(58) Field of Classification Search ................ 250/580, 250/581, 484, 484.4
See application file for complete search history.

(56) References Cited

U.S. PATENT DOCUMENTS

| | | | |
|---|---|---|---|
| 6,444,142 B1* | 9/2002 | Matsumoto et al. | 252/301.4 H |
| 6,483,122 B1* | 11/2002 | Maezawa et al. | 250/582 |
| 2003/0034458 A1* | 2/2003 | Isoda et al. | 250/484.4 |

* cited by examiner

*Primary Examiner*—David Porta
*Assistant Examiner*—Djura Malevic
(74) *Attorney, Agent, or Firm*—Lucas & Mercanti

(57) ABSTRACT

A radiation image conversion panel is disclosed exhibiting superior homogeneity of an activator in a phosphor layer and enhanced luminance and improved sharpness, comprising on a support at least one phosphor layer, wherein the phosphor layer comprises a stimulable phosphor and is formed by a vapor deposition process so that the phosphor layer has a layer thickness of 50 μm to 1 mm, and the phosphor layer exhibits a pH between 0 and 7. There is also disclosed a preparation method of the radiation image conversion panel.

13 Claims, 2 Drawing Sheets

RADIATION IMAGE CONVERSION PANEL AND PREPARATION METHOD THEREOF

FIELD OF THE INVENTION

The present invention relates to a radiation image conversion panel and a method for preparing the same.

BACKGROUND OF THE INVENTION

Although so-called radiography employing silver halide photography is conventionally used to obtain radiographic images, there also has been developed a radiographic imaging method not using silver halide photographic material. Thus, an imaging method is disclosed, in which radiation that has been transmitted through an object is absorbed by phosphor, followed by exciting the phosphor with energy to cause a radiation energy accumulated in the phosphor to radiate in the form of fluorescence, and imaging is achieved by detecting the fluorescence.

Specifically, U.S. Pat. No. 3,859,527 discloses a radiation image conversion method, in which a panel comprising on a support a photostimulable phosphor layer is employed using either or both visible light and infrared rays as the stimulating energy. There have been developed radiation image conversion methods using a photostimulable phosphor(hereinafter, also denoted simply as a stimulable phosphor) exhibiting enhanced luminance and high sensitivity, including, for example, a radiation image conversion method employing BaFX:$Eu^{2+}$ type phosphor (X: Cl, Br, I), as described in JP-A No. 59-75200 (hereinafter, the term, JP-A refers to Japanese Patent Application Publication); a radiation image conversion method employing an alkali halide phosphor, as described in JP-A No. 61-72087; a radiation image conversion method employing an alkali halide phosphor containing, as co-activators, $Tl^+$ and metals such as $Ce^{3+}$, $Sm^{3+}$, $Eu^{3+}$, $Y^{3+}$, $Ag^+$, $Mg^{2+}$, $Pb^{2+}$, or $In^{3+}$, as described in JP-A Nos. 61-73786 and 61-73787.

Recently, a radiation image conversion panel exhibiting further enhanced sharpness has been desired in the field of diagnostic image analysis. Of these, an attempt in controlling the form of stimulable phosphor grains to enhance sensitivity and sharpness was made as a means for improving sharpness of radiographic images. For example, JP-A No. 61-142497 discloses a method of using a stimulable phosphor layer comprising a fine columnar block which has been formed by sedimentation of a stimulable phosphor on a support having fine protruded patterns; JP-A 62-39737 discloses a method of using a radiation image conversion panel having a stimulable phosphor layer having a pseudo-columnar form which has been formed by producing cracks on the layer surface side; JP-A 62-110200 proposes a method in which a stimulable phosphor layer having voids is formed by vapor deposition onto the upper surface of a support, followed by growing voids by subjecting a heating treatment to produce cracks.

JP-A No. 2-58000 proposed a radiation image conversion panel having a stimulable phosphor layer, in which long and thin columnar crystals were formed with an incline at a given angle toward the direction normal to the support.

In the foregoing attempts to control the form of a stimulable phosphor layer, it was intended to enhance image quality by allowing the phosphor layer to have a columnar crystal structure. It was supposed that the columnar form prevented traverse diffusion of stimulated emission light (or photo-stimulated luminescence), i.e., the light reached the support surface with repeating reflection at the interface of cracks (or columnar crystals), thereby leading to markedly enhanced sharpness of images formed by the stimulated luminescence.

Recently, a radiation image conversion panel using a stimulable phosphor containing an alkali halide such as CsBr as a basic substance and Eu as an activator, and the use of activator Eu leading to enhanced X-ray conversion efficiency, which has formerly not been achieved. Introduction of Eu as an activator necessitates to allow Eu to be homogeneously diffused in a crystal, in a di-valent form. However, stability of homogeneous diffusion of Eu within a basic crystal substance under vacuum and prevention of oxidation to tri-valent Eu became problems with preparation of a detector. Such problems have not yet been overcome in the market.

The use of rare earth elements as an activator achieved particularly enhanced X-ray conversion efficiency but resulted in problems in that formation of a homogeneous layer under vacuum was difficult due to vapor pressure characteristics; when a stimulable phosphor layer was formed through vapor phase growth (vapor deposition), there were often conducted heating treatments, such as heating raw material, heating a substrate (or support) during vacuum deposition and annealing (for relaxation of substrate strain) after forming the layer, so that the existing state of the activator was varied, producing problems such as homogeneous layer formation.

Accordingly, improvements were desired with respect to luminance, sharpness and homogeneity of the activator contained in the phosphor layer, as required as a radiation image conversion panel on the market.

SUMMARY OF THE INVENTION

It is an object of the present invention to provide a radiation image conversion panel exhibiting superior homogeneity of an activator in a phosphor layer and enhanced luminance and improved sharpness, and a preparation method of the same.

The foregoing object can be accomplished by the following constitution:

1. A radiation image conversion panel comprising on a support at least one stimulable phosphor layer, wherein the phosphor layer comprises a stimulable phosphor and the phosphor layer is formed by a process of vapor deposition (vapor deposition) so that the phosphor layer has a layer thickness of 50 μm to 1 mm, and the phosphor layer exhibiting a pH (A) falling within the following range:

$$0 < A < 7;$$

2. The radiation image conversion panel as described 1 above, wherein the stimulable phosphor layer comprises a stimulable phosphor represented by the following formula (1), and the stimulable phosphor layer being formed by a vapor deposition process so as to have a layer thickness of 50 μm to 1 mm:

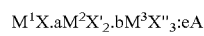  Formula (1)

wherein $M^1$ represents an alkali metal selected from the group consisting of Li, Na, K, Rb and Cs; $M^2$ represents a divalent metal selected from the group consisting of Be, Mg, Ca, Sr, Ba, Zn, Cd, Cu and Ni; $M^3$ represents a trivalent metal selected from the group consisting of Sc, Y, La, Ce, Pr, Nd, Pm, Sm, Eu, Gd, Tb, Dy, Ho, Er, Tm, Yb, Lu, Al, Ga and In; X, X' and X" each represent a halogen selected from the group consisting of F, Cl, Br and I; A represents a metal selected from the group consisting of Eu, Tb, In, Ce, Tm, Dy, Pr, Ho, Nd, Yb, Er, Gd, Lu, Sm, Y, Tl, Na, Ag, Cu and Mg; a, b and e are each $0 \leq a < 0.5$, $0 \leq b < 0.5$ and $0 < e \leq 0.2$;

3. A method of preparing a radiation image conversion panel, the method comprising preparing a radiation image conversion panel as claimed in claim 1 or 2 using a phosphor raw material exhibiting a pH (B) meeting the following requirement $0 < B < 7$.

DETAILED DESCRIPTION OF THE INVENTION

Figure 1:
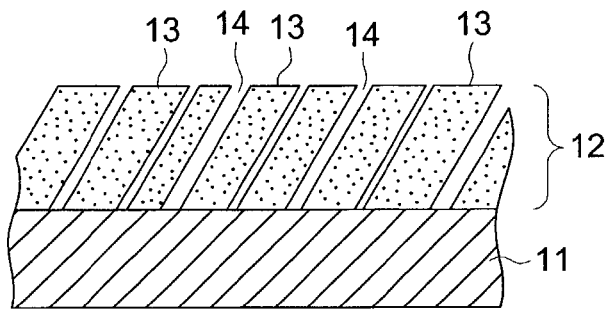
FIG. 1 illustrates a stimulable phosphor layer having columnar crystals formed on the support by a process of vapor deposition (or vapor phase growth).

One aspect of the invention concerns a radiation image conversion panel comprising at least one stimulable phosphor layer, in which the phosphor layer comprises at least a stimulable phosphor and the phosphor layer is formed by a process of vapor deposition process so as to have a thickness of 50 μm to 1 mm and the stimulable phosphor layer exhibiting a pH (A) of $0 < A < 7$, and is also characterized in that the radiation image conversion panel is prepared using a phosphor raw material (hereinafter, also referred to as an evaporation source) exhibiting a pH (B) of $0 < B < 7$.

Allowing a pH (B) of phosphor raw material in which an activator is introduced to fall within the range of $0 < B < 7$ leads to stabilization of divalent Eu contained in a vapor deposition source crystal, minimizing influences of radiation heat of the vapor deposition source during and after vapor deposition and catalytic oxidation caused in the process of forming a vapor-deposited layer and annealing thereof, which is assumed to be due to stabilization by a gaseous atmosphere produced from a Br compound during vapor deposition.

Allowing a pH of the phosphor layer (hereinafter also denoted as a deposited layer) results in the deposited layer removing a double salt and a carbonate as an impurity contained in the vapor deposition source. A deposited layer containing a double salt and a carbonate as an impurity often causes local heat generation in an atmosphere of a heat treatment after vapor deposition, resulting in peeling or cracking of the layer due to difference in heat expansion. Specifically when subjected to annealing treatment in a reducing gas (e.g., hydrogen) atmosphere, such a phenomenon is marked.

In this invention, the pH can be determined in such a manner that 5 g of a material sample (phosphor raw material) is dissolved in 100 g of pure water of a pH of 7.00, and after stirred by a magnetic stirrer and the allowed to stand for 5 min., the pH is measured by the glass electrode method. Similarly to the phosphor raw material, the pH of a deposited layer can be determined using 5 g of the deposited layer.

In this invention, determination of a pH is conducted in accordance with JIS Z-8802, using a handy pH meter, WAT-1 (produced by Shimazu Seisakusho).

In a preferred embodiment of the invention, at least one stimulable phosphor layer comprising a stimulable phosphor is formed in the vapor deposition process so as to have a thickness of 50 μm to 1 mm, and the stimulable phosphor having a halogen ratio (D) of $1.000 < D < 1.050$. Further, in a preferred embodiment of the invention, the radiation image conversion panel is prepared using a phosphor raw material (hereinafter, also referred to as an evaporation source) having a halogen ratio of 1.005 to 1.200. In stimulable phosphors, as represented by formula (1), the halogen ratio is defined as an atomic ratio of X to $M^1$, namely, a ratio of number of X-atoms contained in the phosphor (or phosphor raw material) to that of $M^1$-atoms contained in the phosphor (or phosphor raw material).

In the case of phosphor CsBr:Eu, for example, a phosphor raw material having an atomic ratio of Br/Cs falling within a range of 1.005 to 1.200 is preferably used so that a stimulable phosphor contained in the stimulable phosphor layer (hereinafter, also denoted as a deposited layer) has an atomic ratio of $1.000 < Br/Cs < 1.050$.

The atomic ratio of $X/M^1$, e.g., Br/Cs can be determined in the following manner. Thus, 0.1 g of a phosphor raw material is dissolved in 20 ml of pure water and a ratio value of Br/Cs is determined in accordance with JIS-K-0085, using a radio-frequency plasma emission spectrometry apparatus (ICP). The Br/Cs value of the phosphor layer can also be determined in a similar manner. A radio-frequency plasma emission spectrometer ICPS-8100 (produced by Shimazu Seisakusho) is used.

Enhancing the Br ratio of a vapor deposition source leads to stabilization of divalent Eu contained in a vapor deposition source crystal, minimizing influences of catalytic oxidation caused during vapor deposition or after forming a layer, which is assumed to be due to stabilization by a gaseous atmosphere produced from a Br compound during vapor deposition.

In a Cs halide compound comprised of mono-valent atoms, F-center (basic substance crystal excitation) levels exist multi-stepwise, whereby, an emission spectrum over a broad wavelengths is produced, lowering emission efficiency. Thus, when a halogen is introduced so that a Br/Cs value (D) of the phosphor layer falls within the range of $1.00 < D < 1.05$, the F-center acts as a uniform level or charge compensation, producing a sharp emission and enhanced luminance. However, addition of a halogen so as to give a Br/Cs value of more than 1.05 forms excessive levels, lowering emission efficiency.

In this invention, it is preferred to incorporate rare earth Eu to the evaporation source in an amount of 1 to 100 times the intended introduction into the vapor-deposited layer. Incorporation of an activator into an evaporation source (phosphor raw material) using an activator containing crystal as an evaporation source is preferable in terms of homogeneity of Eu in the vapor-deposited layer and anti-oxidation, as compared to using a mixture of an activator and a crystal. To incorporate the activator, it is preferred to perform synthesis in an aqueous solution by a wet process (or liquid phase process).

Next, the stimulable phosphor represented by formula (1) described earlier will be detailed.

In the formula (1), $M^1$ is at least one alkali metal atom selected from the group consisting of Li, Na, K, Rb and Cs, preferably at least one alkali metal atom selected from Rb and Cs atoms, and more preferably Cs atom.

$M^2$ represents a divalent metal selected from the group consisting of Be, Mg, Ca, Sr, Ba, Zn, Cd, Cu and Ni. Of these, a divalent metal selected from the group consisting of Be, Mg, Ca, Sr, and Ba is preferred.

$M^3$ represents a trivalent metal selected from the group consisting of Sc, Y, La, Ce, Pr, Nd, Pm, Sm, Eu, Gd, Tb, Dy, Ho, Er, Tm, Yb, Lu, Al, Ga. Of these, a trivalent metal selected from the group consisting of Y, Ce, Sm, Eu, Al, Gd, Lu, Ga and In is preferred.

A represents a metal selected from the group consisting of Eu, Tb, In, Ce, Tm, Dy, Pr, Ho, Nd, Yb, Er, Gd, Lu, Sm, Y, Tl, Na, Ag, Cu and Mg.

X, X' and X" are each at least one halogen atom selected from the group consisting of F, Cl, Br and I, preferably at least one halogen atom selected from F, Cl and Br, and more preferably Br in terms of enhancing stimulated emission of a stimulable phosphor.

The stimulable phosphor represented by formula (1) is preferably represented by the following formula (2):

$$M^1X\text{:}eA \qquad \text{formula (2)}$$

wherein $M^1$ is at least one alkali metal selected from the group consisting of Li, Na, K, Rb and Cs; X is at least one halogen atom selected from the group consisting of F, Cl, Br and I; A is at least one metal selected from the group consisting of Eu, Tb, In, Ce, Tm, Dy, Pr, Ho, Nd, Yb, Er, Gd, Lu, Sm, Y, Tl, Na, Ag, Cu and Mg; and e is a number of $0 < e \leq 0.2$.

The stimulable phosphor represented by formula (1) can be prepared, for example, in the following manner.

First, an acid (HI, HBr, HCl or HF) is added to a carbonate so as to form a composition of a phosphor raw material described below and after mixed with stirring, the mixture is filtered at a point of neutralization, and the filtrate was evaporated to obtain crystals having the following composition.

As phosphor raw material, at least one compound selected from each of the following groups (a) and (b), and a compound containing a metal atom selected from the following group (c) are used:

(a) NaF, NaCl, NaBr, NaI, KF, KCl, KBr, KI, RbF, RbCl, RbBr, RbI, CsF, CsCl, CsBr, and CsI;

(b) $MgF_2$, $MgCl_2$, $MgBr_2$, $MgI_2$, $CaF_2$, $CaCl_2$, $CaBr_2$, $CaI_2$, $SrF_2$, $SrCl_2$, $SrBr_2$, $SrI_2$, $BaF_2$, $BaCl_2$, $BaBr_2$, $BaBr_2 \cdot 2H_2O$, $BaI_2$, $ZnF_2$, $ZnCl_2$, $ZnBr_2$, $ZnI_2$, $CdF_2$, $CdCl_2$, $CdBr_2$, $CdI_2$, $CuF_2$, $CuCl_2$, $CuBr_2$, $CuI_2$, $NiF_2$, $NiCl_2$, $NiBr_2$ and $NiI_2$;

(c) Eu, Tb, In, Cs, Ce, Tm, Dy, Pr, Ho, Nd, Yb, Er, Gd, Lu, Sm, Y, Ti, Na, Ag, Cu and Mg.

In the formula (1), "a" is $0 \leq a < 0.5$ and preferably $0 \leq a \leq 0.01$; "b" is $0 \leq b < 0.5$, and preferably $0 \leq b \leq 0.01$; "e" is $0 < e \leq 0.2$, and preferably $0 < e \leq 0.1$.

Phosphor raw materials, which have been selected from the foregoing (a) to (c) so as to have mixing composition meeting the numerical range, as defined in this invention are weighed and dissolved in pure water. In this regard, there may be conducted sufficient mixing using a mortar, ball mill or mixer mill. Next, a prescribed amount of an acid is added to adjust a pH value (C) of the thus obtained solution so as to fall within the range of $0 < C < 7$, and then any water is vaporized.

Further, the obtained raw material mixture is charged into a heat-resistant vessel such as a silica port, an alumina crucible or a silica crucible and then placed in an electric furnace to be calcined. The calcination temperature preferably is 500 to 1000° C. The calcination time, depending on a charging amount of raw materials, calcination temperature and the like, preferably is 0.5 to 6 hrs. As a calcinations atmosphere is employed a weakly reducible atmosphere such as a nitrogen gas atmosphere containing a small amount of hydrogen gas or a carbon dioxide atmosphere containing carbon monoxide, a nitrogen gas atmosphere, a neutral atmosphere such as an argon gas atmosphere, or a trace amount of oxygen-introduced weakly oxidizing atmosphere.

After completion of calcination under the foregoing condition, calcined material is taken out of the electric furnace and subjected to pulverization. Thereafter, powdery calcined material may again be charged into a heat resistant vessel and then placed in an electric furnace to be calcined under the foregoing condition to further enhance emission luminance of the phosphor. When the calcined material is allowed to cool from calcination temperature to room temperature, the intended phosphor can be obtained by being taken out the calcined material from an electric furnace and allowing it to stand in an aerial atmosphere. In this regard, the calcined material may be cooled in the same atmosphere as in the calcination, such as a weakly reducing atmosphere or neutral atmosphere. Alternatively, the calcined material is moved from a heating section to a cooling section within the electric furnace, followed by being rapidly cooled in a weakly reducing atmosphere, neutral atmosphere or weakly oxidizing atmosphere, thereby leading to further enhanced stimulated emission luminance of the phosphor.

In this invention, a stimulable phosphor layer is formed by a process of vapor deposition (or vapor phase growth). The phosphor layer being formed by a process of vapor deposition means that the phosphor layer is formed by a process comprising causing a stimulable phosphor to deposit on a support in a vapor phase to form the stimulable phosphor layer on the support. Thus, the stimulable phosphor is deposited on the support in a vapor phase process to form the phosphor layer having a thickness of 50 μm to 1 mm.

In this invention, an evaporation (or vacuum evaporation) method, a sputter deposition method, a CVD method, ion plating method and other methods can be employed to perform vapor deposition of a stimulable phosphor to form a stimulable phosphor layer on the support.

The foregoing methods are conducted in the manner described below.

The evaporation is conducted in such a manner that after placing a support in an evaporation apparatus, the inside of the apparatus is evacuated to a vacuum degree of $1.333 \times 10^{-4}$ Pa and subsequently, at least a stimulable phosphor is evaporated with heating by the resistance heating method or electron-beam method to cause the phosphor to be deposited at a slant on the surface of the support to a desired thickness. As a result, a stimulable phosphor layer containing no binder is formed, provided that the foregoing evaporation stage may be divided into plural times to form the stimulable phosphor layer. In this evaporation stage, plural resistance heaters or electron beams may be used to perform vapor deposition. Alternatively, raw material of a stimulable phosphor is evaporated using plural resistance heaters or electron beams and the intended stimulable phosphor is synthesized on the support, simultaneously forming a stimulable phosphor layer. After completion of vapor evaporation, a radiation image conversion panel of this invention can be prepared by optionally providing a protective layer on the opposite-side of the stimulable phosphor layer to the support. Vapor deposition may be conducted while cooling or heating the substrate to be deposited thereon. After completion of vapor deposition, the stimulable phosphor layer may be subjected to a heating treatment. In vapor evaporation, a gas such as $O_2$ or $H_2$ may optionally be introduced to perform reactive vapor evaporation.

Sputter deposition is conducted in such a manner that after setting a support in a sputtering apparatus, the inside of the apparatus is evacuated to a vacuum level of $1.333\times10^{-4}$ Pa and then inert gas used for sputtering such as Ar and Ne is introduced therein at a gas pressure of ca. $1.333\times10^{-1}$ Pa, subsequently, sputtering is carried out with targetting the stimulable phosphor to cause the phosphor to be deposited on the slanted surface of the support so as to have a desired thickness. Similarly to the vapor deposition, various treatments may be applied.

Further, there are also applicable the CVD method and ion plating method.

The growth rate of a stimulable phosphor layer in the vapor deposition preferably is 0.05 to 300 μm/min. A growth rate of less than 0.05 μm/min results in lowered productivity of the radiation image conversion panel of this invention and is not preferable. In the case of a growth rate of more than 300 μm/min, it is difficult to control the growth rate and is not unsuitable.

A radiation image conversion panel which has been prepared by the vapor evaporation method or sputter deposition method contains no binder, leading to increased filling density of the stimulable phosphor layer and thereby a radiation image conversion panel with enhanced sensitivity and sharpness can be obtained.

A thickness of the stimulable phosphor layer, depending on the intended use of the radiation image conversion panel and the kind of stimulable phosphor, preferably is 50 μm to 1 mm, more preferably 50 to 300 μm, still more preferably 100 to 300 μm, and optimally 150 to 300 μm.

In the formation of a stimulable phosphor layer by the vapor deposition process, a support on which the stimulable phosphor layer is to be formed, is preferably heated at a temperature of 100° C. or higher, more preferably 150° C. or higher, and still more preferably 150 to 400° C.

The reflectance of a stimulable phosphor layer preferably is not less than 20%, more preferably not less than 30%, and still more preferably not less than 40%, with an upper limit of 100%.

Further, spacing between columnar crystals may be filled with a filler such as a binder to strengthen the phosphor layer. Furthermore, material exhibiting relatively high light absorbance or high reflectance may be used as filler. The use thereof prevents lateral diffusion of stimulating light entering the phosphor layer, in addition to the foregoing strengthening effect.

Next, formation of the stimulable phosphor of this invention will be described based on FIGS. 1 and 2. FIG. 1 exemplarily illustrates a stimulable phosphor layer having columnar crystals formed on the support by a process of vapor deposition (or vapor phase growth). In the FIG. 1, the numeral 11 designates a support, the numeral 12, a stimulable phosphor layer, and numeral 13, columnar crystals forming the stimulable phosphor layer. The numeral 14 indicates spacing between columnar crystals.

Figure 2:
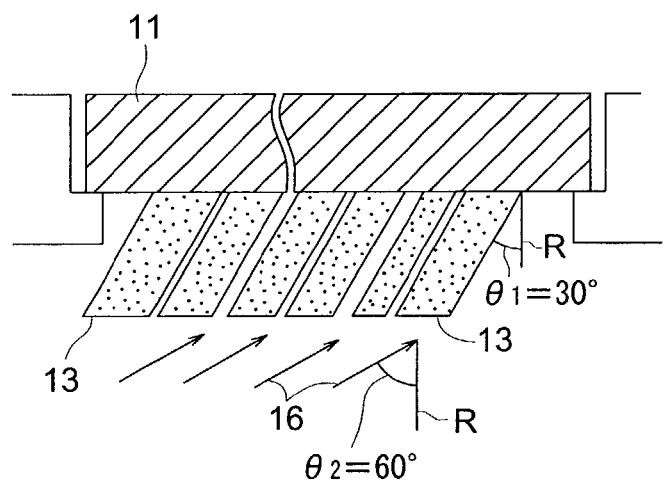
FIG. 2 illustrates the mode of forming a stimulable phosphor layer on a support by the vapor deposition method.

FIG. 2 illustrates the mode of forming a stimulable phosphor layer on a support by the vapor deposition method, in which vapor streams (16) of a stimulable phosphor are introduced at an incident angle $\theta_2$ (in the Figure, 60°) to the line (R) normal to the support surface to form columnar crystals on the support, at an angle of $\theta_1$ (in the Figure, 30°, empirically, about a half of the incident angle).

The stimulable phosphor layer formed on the support contains no binder, leading to superior directionality and enhanced directionality of stimulating light and stimulated luminescence and enabling formation of a thicker phosphor layer, as compared to radiation image conversion panel having a dispersion-type stimulable phosphor layer, in which a stimulable phosphor is dispersed in a binder. Moreover, reduced scattering of stimulating light in the stimulable phosphor layer results in enhanced sharpness.

Further, spacing between columnar crystals may be filled with a filler such as a binder to strengthen the phosphor layer. Furthermore, material exhibiting relatively high light absorbance or high reflectance may be used as filler. The use thereof prevents lateral diffusion of stimulating light entering the phosphor layer, in addition to the foregoing strengthening effect. Material exhibiting high reflectance refers to one exhibiting a high reflectance with respect to stimulating light (500 to 900 nm, specifically 600 to 800 nm), including metals such as aluminum, magnesium, silver and indium, white pigments and colorants ranging green to red.

White pigments can also reflect stimulating light. Examples thereof include $TiO_2$ (anatase type, rutile type), MgO, $PbCO_3$, $Pb(OH)_2$, $BaSO_4$, $Al_2O_3$, M(II)FX [in which M(II) is at least one of Ba, Sr and Ca, X is at least one of Cl and Br], $CaCO_3$, ZnO, $Sb_2O_3$, $SiO_2$, $ZrO_2$, lithopone ($BaSO_4$.ZnS), magnesium silicate, basic lead silisulfate, and aluminum silicate. These white pigments exhibit high covering power and have a refractive index high, whereby stimulated luminescence is easily scattered through reflection or refraction, leading to enhanced sensitivity of the radiation image conversion panel.

Examples of material exhibiting high light absorbance include carbon, chromium oxide, nickel oxide, iron oxide, and blue colorants. Of these, carbon absorbs stimulated luminescence.

Colorants may be any organic or inorganic colorants. Examples of organic colorants include Zapon Fastblue 3G (produced by Hoechst A.G.), Estrol Brillblue N-3RL (produced by Sumitomo Chemical Ind. Co. Ltd.), D6CBlue No. 1 (produced by National Aniline Co.), Spirit Blue (produced by HODOGAYA KAGAKU Co., Ltd.), Oilblue No. 603 (produced by Orient Co., Ltd.), Kiton Blue A (produced by Chiba Geigy Co.), Aisen Catironblue GLH (produced by HODOGAYA KAGAKU Co., Ltd.), Lakeblue AFH (produced by KYOWA SANGYO Co., Ltd.), Primocyanine 6GX (produced by INAHATA SANGYO o. Ltd.), Briilacid Green 6BH (produced by HODOGAYA KAGAKU Co., Ltd.), Cyanblue BNRCS (produced by Toyo Ink Co., Ltd.), and Lyonoyl Blue SL (produced by Toyo Ink Co., Ltd.). There are also cited organic metal complex colorants such as Color Index 24411, 23160, 74180, 74200, 22800, 23154, 23155, 24401, 14830, 15050, 15760, 15707, 17941, 74220, 13425, 13361, 13420, 11836, 74140, 74380, 74350 and 74460. Examples of inorganic colorants include ultramarine, cobalt blue, celureun blue, chromium oxide, and $TiO_2$—ZnO—NiO type pigments.

There are used, as a support, a variety of polymeric materials, glass, ceramics and metals. Preferred examples thereof include plate glass such as quartz, borosilicate glass, chemically tempered glass and crystallized glass; ceramics such as alumina and silicon nitride; plastic film such as cellulose acetate film, polyester film, polyethylene terephthalate film, polyamide film, polyimide film, triacetate film, and polycarbonate film; metal sheets such as aluminum, iron, copper and chromium, and metal sheet covered with a hydrophilic fine particle layer. The support may be smooth-surfaced, or it may be matted in order to enhance adhesion of the support to the stimulable phosphor layer. To enhance adhesion between the support and stimulable phosphor layer, the surface of the support may optionally be provided with an adhesion promoting layer in advance. A thickness of the support, depending on material, is usually 80 to 2000 μm, and preferably 80 to 1000 μm in terms of handling.

The stimulable phosphor layer may be provided thereon with a protective layer. The protective layer may be formed by coating a coating composition for the protective layer on the stimulable phosphor layer or the protective layer which was previously prepared may be adhered to the support. Alternatively, a procedure of forming a stimulable phosphor layer on the protective layer which was previously prepared is also applicable. Materials used for the protective layer include those which are usually used for protective layers. Examples thereof include cellulose acetate, nitrocellulose, polymethyl methacrylate, polyvinyl butyral, polyvinyl formal, polycarbonate, polyeater, polyethylene terephthalate, polyethylene, polyvinylidene chloride, nylon, polytetrafluoroethylene, polytrifluoroethylene, copolymer of terafluoroethylene and hexafluoropropylene, copolymer of vinylidene chloride and vinyl chloride, and copolymer of vinylidene chloride and acrylonitrile. Further, a transparent glass substrate may be used as a support. Furthermore, inorganic material such as SiC, $SiO_2$, SiN, and $Al_2O_3$ may be allowed to deposit by means of the vapor deposition or sputtering method to form the protective layer. The thickness of a protective layer is preferably 0.1 to 2,000 μm.

Figure 3:
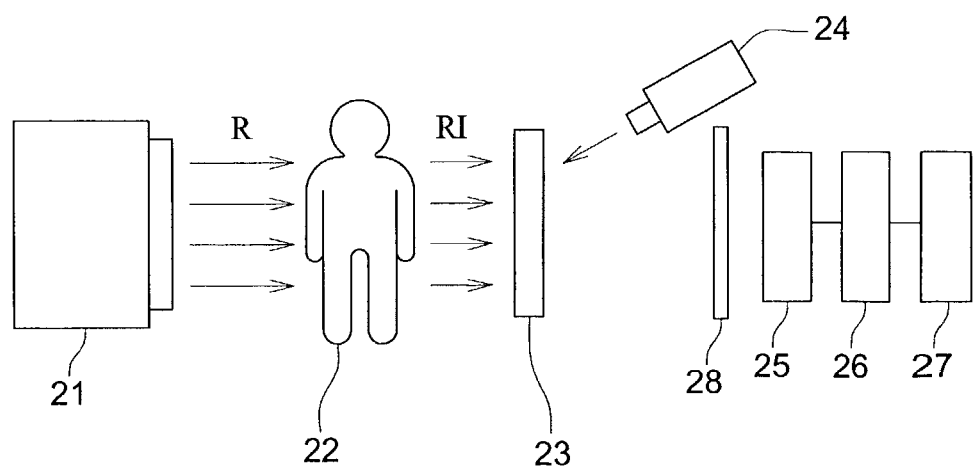
FIG. 3 shows an example of obtaining a transmission-type radiation image using a radiation image conversion panel according to the invention.

FIG. 3 illustrates a constitution of a radiation image conversion panel of this invention. In FIG. 3, the numeral 21 designates a radiation generating apparatus, 22 designates an object, 23 designates a radiation image conversion panel having a visible- or infrared-stimulable phosphor layer, 24 designates a stimulating light source to cause a latent image stored in the radiation image conversion panel (23) to be emitted as stimulated luminescence, 25 designates a photoelectric conversion apparatus to detect the stimulated luminescence emitted from the radiation image conversion panel (23), 26 designates an image reproduction apparatus to reproduce photoelectric conversion signals detected in the photoelectric conversion apparatus (25) in the form of an image, 27 designates a display apparatus to display reproduced images, and 28 designates a filter for reflected light from a light source (24) to allow only light emitted from the radiation image conversion panel (23) to pass therethrough. FIG. 3 shows an example of obtaining a transmission-type radiation image, and in cases where the object (22) itself radiates radiation, a radiation generation apparatus (21) may not be required. An apparatus subsequent to the photoelectric conversion (25) apparatus may be any one that is capable of reproducing light information from the radiation image conversion panel (23), in any image form.

As shown in FIG. 3, when the object (22) is arranged between the radiation generation apparatus (21) and the radiation image conversion panel (23), and exposed to radiation (R), the radiation (R) transmits the respective portions of the object (22) in accordance with radiation transmittance thereof and the resulting transmission image (RI), i.e., an image having different radiation intensities enters the radiation image conversion panel (23). The thus entered transmission image (RI) is absorbed in a stimulable phosphor layer of the radiation image conversion panel (23), in which electrons and/or holes are generated in proportion to the dose of the absorbed radiation and accumulated at a trap level of the stimulable phosphor to form a latent image accumulating energies of the radiation transmission image. Subsequently, the latent image is excited with light energy to form an actual image, i.e., the stimulated phosphor layer is irradiated with the light source (24) irradiating visible or infrared light to eject the electrons and/or holes accumulated on the trap level to emit the accumulated energy in the form of stimulated luminescence. The intensity of the emitted luminescence is proportional to the number of accumulated electrons and/or holes, that is, energy of the radiation absorbed in the stimulable phosphor of the radiation image conversion panel (23). The thus obtained light signals are converted to electric signals by the photoelectric conversion (25) apparatus such as a photomultiplier, which are reproduced as an image in image processor (26), displaying the image in image display apparatus (27). As the image processor (26), it is effective to employ one which not only reproduces the electric signals as the image signal but one which can also conduct image processing, computation, memory and storage of the image.

The stimulated luminescence emitted from the stimulable phosphor layer, having a spectral distribution in the lower wavelength region is preferable, based on the reason that the stimulated luminescence emitted from the stimulable phosphor layer is required to be separated from the reflected stimulating light and photoelectric converters to receive the luminescence emitted from the stimulable phosphor layer, in general, are provided with a sensor having higher sensitivity to light energy of 600 nm or less. Emission of stimulable phosphors relating to the invention falls within the wavelength region of 300 to 500 nm and the stimulating light wavelength is 500 to 900 nm, satisfying the foregoing conditions. Further, along with a recent trend of down-sizing diagnostic apparatuses, semiconductor lasers which exhibit a higher output and are capable of being further down-sized are preferably employed for use in reading images of the radiation image conversion panel. The semiconductor laser has a wavelength of 680 nm and the stimulable phosphor used in the radiation image conversion panel of the invention exhibits extremely superior sharpness when using a stimulating light of 680 nm. Thus, the stimulable phosphors relating to the invention emit luminescence having a main peak at 500 nm or less, which is easily separable from the stimulating light and compatible with spectral sensitivity of the receiver, leading to enhanced light-receiving efficiency and enhanced sensitivity of an image receiving system.

Light sources including the stimulating wavelength for the stimulable phosphor used in the radiation image conversion panel (23) are used as the stimulating light source (24). Specifically, the use of laser light simplifies an optical system and leads to enhanced stimulating light intensity, resulting in preferable performance. Examples of the laser include an He—Ne laser, He—Cd laser, Ar ion laser, Kr laser, $N_2$ laser, YAG laser and its second harmonic wave, ruby laser, semiconductor laser, various dye lasers, and metal vapor lasers such as a copper vapor laser. Of these, continuous oscillation lasers such as an He—Ne laser and an Ar ion laser are usually desirable, and pulse-oscillated lasers are also usable by synchronizing the pulse with a scanning time for one pixel of the panel. In cases when employing retarded emission for separation, instead of using the filter (28), the use of the pulse-oscillated laser is preferable rather than modulation of the continuous oscillation laser, as described in JP-A No. 59-22046. Of the various laser light sources described above, semiconductor lasers are specifically preferred in terms of being compact, inexpensive and not requiring a modulator.

The filter (28) cuts reflected stimulating light and allows the stimulated luminescence emitted from the radiation image conversion panel (23) to transmit, which is determined by the combination of the stimulated emission wavelength of a stimulable phosphor contained in the radiation image conversion panel (23) and the stimulating light source (24). In the preferred practical combination of a stimulating light wavelength of 500 to 900 nm with a stimulated emission wavelength of 300 to 500 nm, for example, violet to blue glass filters are used, such as C-39, C-40, V-40, V-42 and V-44 (available from TOSHIBA CORP.), 7-54 and 7-59 (available from Corning Co.), BG-1, BG-3, BG-25, BG-37 and BG-38 (available from Spectrofilm Co.). Interference filters are usable by selecting specific filters. The photoelectric conversion apparatus (25) usable in the invention includes any one capable of converting variation of luminous energy to electric signal, such as a photoelectric tube, a photomultiplier, a photodiode, a phototransistor, a solar cell, and photoconductive elements.

EXAMPLES

The present invention will be further described based on examples but embodiments of the invention is by no means limited to these examples.

Example 1

Preparation of Radiation Image Conversion Panel

Preparation of Samples 1 through 8

Figure 4:
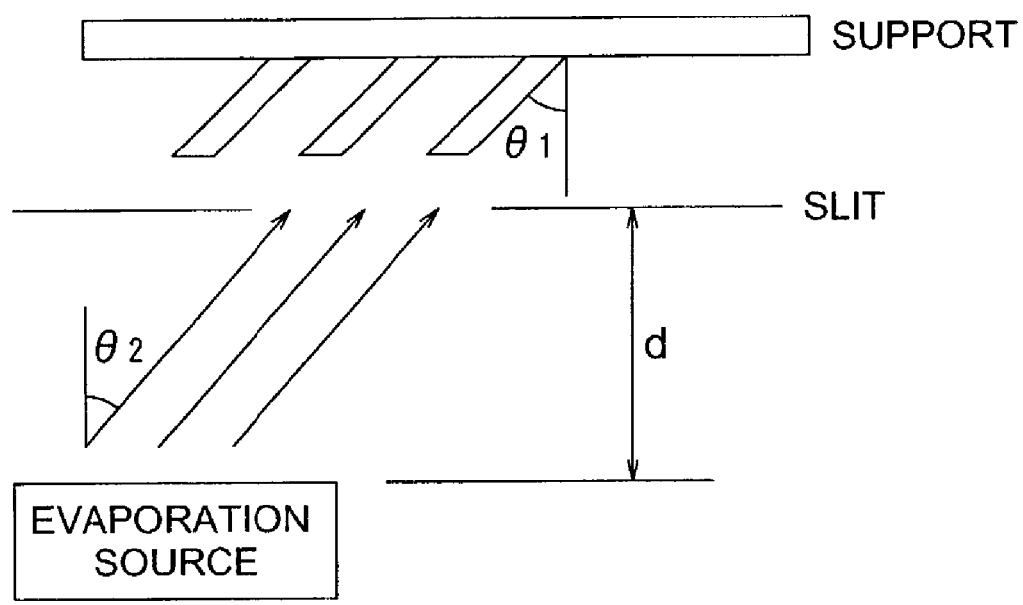
FIG. 4 illustrates formation of a stimulable phosphor layer by vapor deposition.

On the surface of a 1 mm thick crystallized glass support (produced by Nippon Denki Glass Co., Ltd.) was formed a stimulable phosphor layer containing stimulable phosphor (CsBr:Eu) according to the condition shown in Table 1, using a vapor deposition apparatus as shown in FIG. 4 (in which $\theta_1=5°$ and $\theta_2=5°$ were respectively set). In the vapor deposition apparatus as shown in FIG. 4, the phosphor was introduced using an aluminum slit at a distance (d) of 60 cm between a slit and a evaporation source with transporting the support in the parallel direction to form a 300 μm thick stimulable phosphor layer.

In the vapor deposition, the support was set in the evaporation chamber of an evaporator and then, phosphor raw material, as an evaporation source (CsBr:Eu) which was previously molded in a press was put into a water-cooled crucible. Thereafter, the inside of the evaporator was evacuated and after introducing $N_2$ gas to adjust a degree of vacuum of 0.133 Pa, vapor deposition was conducted to perform vapor deposition, while maintaining the support temperature (also called substrate temperature) at 350° C. The vapor deposition was completed when the thickness of the stimulable phosphor layer reached 300 μm and then, the phosphor layer was subjected to a heating treatment at 400° C. Peripheral portions of the support and a protective layer comprised of borosilicate glass were sealed with an adhesive in a dry aerial atmosphere to prepare a radiation image conversion panel sample 1 (comparative sample), comprising a phosphor layer having a shielded structure.

Radiation image conversion panel samples 2 through 8 were prepared similarly to sample 1, except for conditions shown in Table 1.

The thus obtained radiation image conversion panel samples 1 through 8 were each evaluated in the manner described below.

Evaluation of Sharpness

Modulation transfer function (MTF) was determined for each of the radiation image conversion panel samples to evaluate sharpness. Thus, after a CTF chart was adhered to the respective radiation image conversion panels, each of the panels was exposed at 10 mR of 80 kVp X-rays (at a distance to the object: 1.5 m). Thereafter, sample were each scanned with a semiconductor laser light beam (690 nm, a power of 40 mW on the panel) of 100 μm diameter to read it. As shown in Table 1, MTF values (sharpness) of the respective panels were represented by the sum of the MTF values at 2.0 lp/mm.

Evaluation of Luminance and Luminance Distribution

Samples were each evaluated with respect to luminance, using Regius 350, trade name, produced by Konica Corp. Thus, similarly to the foregoing sharpness evaluation, radiation image conversion panel samples were each exposed to X-rays of a tungsten bulb at 80 kVp and 10 mAs and at a distance an X-ray source and the sample plate, and thereafter, the sample plate was set on the Regius 350 and read. Evaluation was made from electric signals obtained by a photomultiplier. Luminance as represented by a relative value, based on the luminance of sample 6 being 1.25.

Distribution of electric signals within the exposed panel plate, obtained from the photomultiplier was evaluated. Thus, a standard deviation of the luminance distribution was determined for each panel sample (which was also denoted simply as S.D.). The less value indicates superior homogeneity of an activator.

Further, the pH value of the stimulable phosphor layer and that of phosphor raw material were each determined in accordance with the procedure described earlier.

TABLE 1

| Sample | Activator | pH Raw Material | pH Phosphor Layer | Luminance | MTF (2 lp/mm) | *3 S.D | Remark |
|---|---|---|---|---|---|---|---|
| 1 | Eu (D*1) | 7.6 | 7.8 | 0.001 | 12% | 48 | Comp. |
| 3 | Eu (W) | 6.2 | 6.9 | 0.69 | 36% | 7 | Inv. |
| 4 | Eu (W) | 5.3 | 6.8 | 0.89 | 33% | 8 | Inv. |
| 5 | Eu (W) | 3.8 | 6.6 | 0.92 | 32% | 6 | Inv. |
| 6 | Eu (W) | 2.2 | 5.2 | 1.25 | 33% | 4 | Inv. |
| 7 | Eu (W) | 1.2 | 4.4 | 1.47 | 32% | 6 | Inv. |
| 8 | Eu (W) | 1.0 | 3.4 | 1.88 | 38% | 4 | Inv. |

*1 activator was incorporated in a dry process;
*2 activator was incorporated in a wet process.
*3 luminance distribution As can be seen from Table 1, it was proved that inventive samples led to superior results.

Example 2

Radiation image sample 23 was prepared similarly to sample 1 in Example 1. Radiation image conversion panel samples 24 through 27 were prepared similarly to sample 23, provided that the halogen ratio was adjusted so as to have values as shown in Table 2. The thus prepared samples were evaluated with respect to sharpness and luminance similarly to Example 1.

Distribution of electric signals within the exposed panel plate, obtained from the photomultiplier was evaluated. Thus, a standard deviation of the luminance distribution was determined for each panel sample (which was also denoted simply as S.D.). The less value indicates superior homogeneity of an activator.

Further, the halogen ratio of the stimulable phosphor layer and that of phosphor raw material were determined in accordance with the procedure described earlier.

TABLE 2

| Sample | Activator | Raw Material (Br/Cs) | Phosphor Layer (Br/Cs) | Luminance | MTF (2 lp/mm) | S.D.*[1] |
|---|---|---|---|---|---|---|
| 23 | Eu (W*[2]) | 1.005 | 1.002 | 0.82 | 36% | 16 |
| 24 | Eu (W) | 1.012 | 1.007 | 1.22 | 33% | 7 |
| 25 | Eu (W) | 1.018 | 1.011 | 1.54 | 32% | 3 |
| 26 | Eu (W) | 1.035 | 1.022 | 2.04 | 33% | 5 |
| 27 | Eu (W) | 1.104 | 1.049 | 1.34 | 38% | 19 |

*[1] luminance distribution
*[2] activator was incorporated in a wet process.

As can be seen from Table 2, it was proved that samples led to superior results, specifically in luminance distribution.

What is claimed is:

1. A radiation image conversion panel comprising on a support at least one phosphor layer, wherein the phosphor layer comprises a stimulable phosphor and is formed by a process of vapor deposition so that the phosphor layer has a layer thickness of 50 μm to 1 mm, and the phosphor layer exhibiting a pH (A) falling within the following range:

0<A<7.

2. The radiation image conversion panel of claim 1, wherein the stimulable phosphor is represented by the following formula (1):

$M^1X.aM^2X'.bM^3X'':eA$     formula (1)

wherein $M^1$ is at least one alkali metal atom selected from the group consisting of Li, Na, K, Rb and Cs; $M^2$ is at least one divalent metal atom selected from the group consisting of Be, Mg, Ca, Sr, Ba, Zn, Cd, Cu and Ni; $M^3$ is at least one trivalent metal atom selected from the group consisting of Sc, Y, La, Ce, Pr, Nd, Pm, Sm, Eu, Gd, Tb, Dy, Ho, Er, Tm, Yb, Lu, Al, Ga and In; X, X' and X" are each a halogen atom selected from the group consisting of F, Cl, Br and I; A is a metal atom selected from the group consisting of Eu, Tb, In, Ce, Tm, Dy, Pr, Ho, Nd, Yb, Er, Gd, Lu, Sm, Y, Tl, Na, Ag, Cu and Mg; a, b and e are each $0 \leq a < 0.5$, $0 \leq b < 0.5$ and $0 < e \leq 0.2$.

3. The radiation image conversion panel of claim 2, wherein in the formula (1), $M^1$ is at least one alkali metal atom selected from the group consisting of Rb and Cs.

4. The radiation image conversion panel of claim 2, wherein in the formula (1), $M^2$ is at least one divalent metal atom selected from the group consisting of Be, Mg, Ca, Sr and Ba.

5. The radiation image conversion panel of claim 2, wherein in the formula (1), $M^3$ is at least one trivalent metal atom selected from Y, La, Ce, Sm, Eu, Gd, Al, Ga and In.

6. The radiation image conversion panel of claim 2, wherein in the formula (1), X is a halogen atom selected from the group consisting of F, Cl and Br.

7. The radiation image conversion panel of claim 2, wherein the stimulable phosphor is represented by the following formula (2):

$M^1X:eA$     formula (2)

Wherein $M^1$, X, A and e are each the same as defined in formula (1).

8. The radiation image conversion panel of claim 7, wherein the phosphor layer has a halogen ratio (D) falling within the following range:

1.000<D<1.050 wherein the halogen ratio (D) is an atomic ratio of X to $M^1$.

9. A method of preparing a radiation image conversion panel as claimed in claim 1, the method comprising:
    preparing a stimulable phosphor raw material and
    depositing a stimulable phosphor on a support using the stimulable phosphor raw material by vapor deposition to form a phosphor layer on the support,
    wherein the stimulable phosphor raw material exhibits a pH (B) falling within the following range:

0<B<7.

10. The method of claim 9, wherein the stimulable phosphor is represented by the following formula (1):

$M^1X.aM^2X'.bM^3X'':eA$     formula (1)

wherein $M^1$ is at least one alkali metal atom selected from the group consisting of Li, Na, K, Rb and Cs; $M^2$ is at least one divalent metal atom selected from the group consisting of Be, Mg, Ca, Sr, Ba, Zn, Cd, Cu and Ni; $M^3$ is at least one trivalent metal atom selected from the group consisting of Sc, Y, La, Ce, Pr, Nd, Pm, Sm, Eu, Gd, Tb, Dy, Ho, Er, Tm, Yb, Lu, Al, Ga and In; X, X' and X" are each a halogen atom selected from the group consisting of F, Cl, Br and I; A is a metal atom selected from the group consisting of Eu, Tb, In, Ce, Tm, Dy, Pr, Ho, Nd, Yb, Er, Gd, Lu, Sm, Y, Tl, Na, Ag, Cu and Mg; a, b and e are each $0 \leq a < 0.5$, $0 \leq b < 0.5$ and $0 < e \leq 0.2$.

11. The method of claim 10, wherein the stimulable phosphor is represented by the following formula (2):

$M^1X:eA$     formula (2)

Wherein $M^1$, X, A and e are each the same as defined in formula (1).

12. The method of claim 11, wherein the phosphor layer has a halogen ratio (D) falling within the following range:

1.000<D<1.050 wherein the halogen ratio (D) is an atomic ratio of X to $M^1$.

13. the method of claim 11, wherein the stimulable phosphor raw material has a halogen ratio (D') falling within the following range:

1.005<D'<1.200 wherein the halogen ratio (D') is an atomic ratio of X to $M^1$.

* * * * *